(12) United States Patent
Giacomini et al.

(10) Patent No.: US 9,720,249 B2
(45) Date of Patent: Aug. 1, 2017

(54) LIGHT COLLIMATORS AND METHODS FOR HUMAN MACHINE INTERFACES

(71) Applicant: Whirlpool Corporation, Benton Harbor, MI (US)

(72) Inventors: Neomar Giacomini, Benton Harbor, MI (US); Mark E. Glotzbach, Granger, IN (US); Brian N. Radford, Stevensville, MI (US); Eric J. Schuh, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 257 days.

(21) Appl. No.: 14/525,823

(22) Filed: Oct. 28, 2014

(65) Prior Publication Data
US 2016/0116756 A1    Apr. 28, 2016

(51) Int. Cl.
G02B 27/30    (2006.01)
G02B 27/34    (2006.01)
G02B 27/09    (2006.01)

(52) U.S. Cl.
CPC ............. *G02B 27/30* (2013.01); *G02B 27/09* (2013.01); *G02B 27/34* (2013.01)

(58) Field of Classification Search
CPC ......... G02B 27/30; G02B 27/09; G02B 27/34
USPC ........................................................ 359/641
See application file for complete search history.

(56) References Cited

U.S. PATENT DOCUMENTS

| | | | |
|---|---|---|---|
| 3,491,245 A * | 1/1970 | Hardesty | G02B 27/34 250/227.11 |
| 3,531,181 A | 9/1970 | Scarrot | |
| 4,127,936 A | 12/1978 | Schlup et al. | |
| 4,772,769 A | 9/1988 | Shumate | |
| 8,049,115 B2 | 11/2011 | Chung et al. | |
| 8,615,151 B2 | 12/2013 | Rinko | |
| 2003/0048819 A1* | 3/2003 | Nagano | G02B 6/4206 372/36 |
| 2008/0285271 A1* | 11/2008 | Roberge | F21S 8/033 362/235 |
| 2011/0230065 A1 | 9/2011 | Bergner et al. | |
| 2012/0051063 A1* | 3/2012 | Holder | F21V 5/008 362/299 |
| 2012/0306757 A1* | 12/2012 | Keist | B29C 45/0053 345/168 |
| 2013/0051014 A1* | 2/2013 | Sikkens | F21S 48/1154 362/235 |
| 2014/0133797 A1* | 5/2014 | Levy | G02B 6/425 385/14 |
| 2015/0117014 A1* | 4/2015 | Bailey | F21V 13/04 362/293 |

FOREIGN PATENT DOCUMENTS

JP    3204294 B2    9/2001

* cited by examiner

*Primary Examiner* — Ricky Mack
*Assistant Examiner* — Daniele Manikeu

(57) ABSTRACT

Light collimators and methods for human machine interfaces are disclosed. An example human machine interface includes a top surface having a decorative element to be illuminated, a light source, and a plurality of parallel light collimators that collimate visible light emitted by the light source and direct the collimated light toward the bottom side of the decorative element. An example method of illuminating a decorative element of a human machine interface includes emitting light, passing the light through a plurality of collimators defined in the human machine interface, and directing the collimated light toward the decorative element.

18 Claims, 1 Drawing Sheet

LIGHT COLLIMATORS AND METHODS FOR HUMAN MACHINE INTERFACES

BACKGROUND

Many devices have human machine interfaces that allow a person to operate the device. Example human machine interface elements include decorative elements such as illuminated icons, indicators, depictions and images.

DETAILED DESCRIPTION

Increasingly, human machine interfaces include illuminated decorative elements such as illuminated icons, indicators, depictions, images, etc. Some conventional human machine interfaces include a printed circuit board (PCB) having a thru hole (i.e., a via) the size of a decorative element that is to be illuminated. Because of the relatively large size of these thru holes, light exits a thru hole at varying angles, which leads to undesirable light bleed. That is, light is often emitted beyond the boundaries of the decorative element. Such light bleed may result in decorative elements appearing to have a halo, looking diffuse, looking muddled, looking cheap, looking unclear, less crisp, etc., all of which can lead to diminished perceived aesthetics, a perception of low quality, diminished customer satisfaction, etc.

To overcome at least these problems, human machine interfaces having a plurality of substantially parallel light collimators beneath a decorative element that is to be illuminated are disclosed. The example human machine interfaces disclosed herein may be used as part of any apparatus or device having a human machine interface with illuminated decorative elements. Example apparatuses and devices include, but are not limited to, a domestic appliance such as a refrigerator, a stove, a range, an oven, a microwave, a dishwasher, a washing machine, a dryer, a freezer, an ice maker, a wine cooler, a beer cooler, a clothes refresher, etc., and/or in any other apparatus, device, etc. having a human machine interface.

As used herein, terms such as up, down, top, bottom, side, end, front, back, etc. are used with reference to a currently considered or illustrated orientation of an item. Were the item considered with respect to another orientation, it will be understood that such terms need to be correspondingly modified.

Reference will now be made in detail to embodiments of this disclosure, examples of which are illustrated in the accompanying drawings. While the examples disclosed herein are, for ease of illustration, flat human machine interfaces, it should be understood that human machine interfaces according to this disclosure may be curved. Moreover, for ease of discussion, the examples disclosed herein are described with reference to a rigid PCB. However, it should be understood that the examples disclosed herein may be implemented using other electronic substrates such as, but not limited to, other types rigid substrate, a flexible substrate (e.g., a flexible PCB), and a thin and sometimes transparent electronic film.

Figure 1:
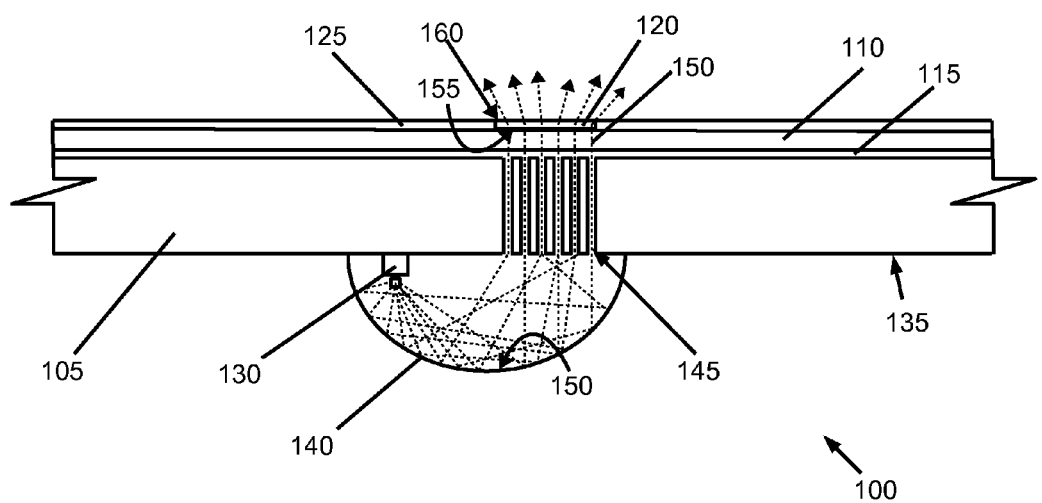
FIG. 1 is a cross-sectional view of an example human machine interface constructed in accordance with the teachings of this disclosure.

FIG. 1 illustrates an example human machine interface 100 constructed in accordance with the teachings of this disclosure. The example human machine interface 100 of FIG. 1 includes a PCB 105, and a plastic substrate, front or fascia 110. In the example of FIG. 1, the PCB 105 and the fascia 110 are adhered to each other by an adhesive 115. However, any other suitable means, including but not limited to mechanical, of affixing the PCB 105 to the fascia 110 may, additionally or alternatively, be used.

The example fascia 110 of FIG. 1 may be formed of a decorative material, such as black plastic, etc. The top of the example fascia 110 (in the orientation of FIG. 1) is the portion of the human machine interface 100 intended to be seen by and used by a user to control a device associated with the human machine interface 100. The fascia 110 includes one or more decorative elements 120 intended for illumination. Example decorative elements 120 include, but are not limited to, icons, indicators, depictions, images, etc. In the illustrated example, the fascia 110 includes an applied decorative film 125 containing, including, defining, having, etc. the decorative elements 120. Portions of the decorative film 125 outside the decorative elements 120 may be opaque to reduce light bleed. In some examples, an applied layer of paint, colored plastic, etc. replace the decorative film 125. While not shown in FIG. 1 for illustrative clarity, the decorative elements 120 may be associated with respective capacitive touch pads or areas.

To form light used to illuminate the decorative element 120, the example human machine interface 100 includes a light source 130 mounted to the bottom 135 of the PCB 105. The example light source 130 is a visible light emitting diode (LED), however, other applicable light sources may be used. In the example of FIG. 1, the LED 130 emits visible light generally away from the bottom 135 of the PCB 105. In some examples, the light source 130 is printed onto an electronic substrate or film rather than being soldered to the substrate.

To direct the light emitted by the light source 130 back toward the decorative element 120, the example human machine interface 100 includes a reflector 140. The reflector 140 reflects the light emitted by the light source 130 back toward the bottom 135 of the PCB 105. The example reflector 140 has an ellipsoid shape (e.g., a hemispherical shape) and an interior reflective surface 150. Alternatively, the visible light LED 130 may be replaced with a ultra-violet (UV) or phosphor-less LED, and the reflector 140 replaced by a phosphor diffusion material at least partially encompassing the phosphor-less LED and surrounded by, for example, substantially opaque material. Alternatively, the phosphor-less LED 130 may be at least partially encompassed by a phosphor material by painting, coating and/or otherwise depositing a phosphor material on the interior surface of the reflector 140. In some examples, a light guide directs the light emitted by the light source 130 toward the collimators To collimate and direct the light reflected by the reflector 140 toward the decorative element 120, the example PCB 105 of FIG. 1 includes a plurality of substantially parallel collimators (one of which is designated at reference numeral 145). The example collimators 145 form, create, guide or otherwise generate a plurality of substantially parallel light beams from the light emitted by the light source and/or reflected by the reflector 140, one of which is designated at reference numeral 150, and direct the parallel light beams 150 toward the bottom 155 of the decorative element 120. Because the light beams 150 are substantially parallel, light bleed outside the perimeter 160 of the decorative element 120 is reduced. That is the light beams 150 strike the bottom of the film 125 substantially within the boundary or perimeter 160 of the decorative element 120.

Figure 2:
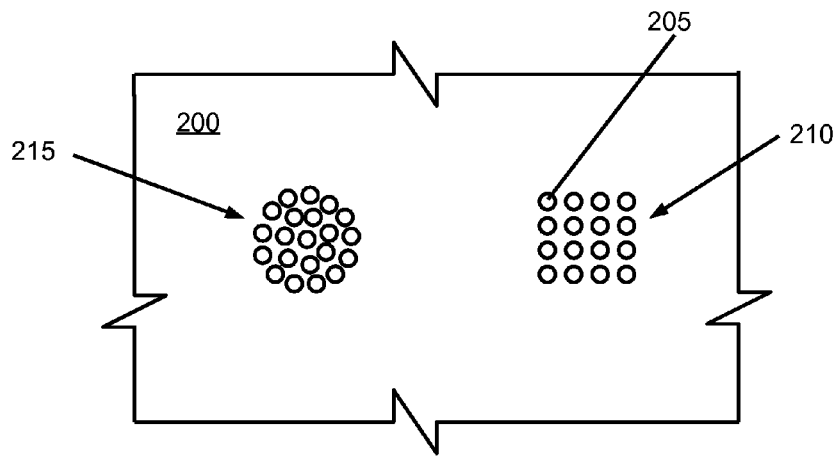
FIG. 2 is a top view of an example printed circuit board of a human machine interface constructed in accordance with the teachings of this disclosure.

The example collimators 145 of FIG. 1 are thru holes defined or drilled thru the PCB 105. The thru holes may be plated or un-plated. Turning to FIG. 2, a top view of an example PCB 200 constructed in accordance with this disclosure is shown. The example PCB 200 has a plurality of substantially parallel collimators, one of which is designated at reference numeral 205, that are arranged in to different groups 210 and 215. Each of the example groups 210, 215 has an associated decorative element (not shown). As shown, the groups 210, 215 may have different shapes (e.g., a square, a circle, etc.) according generally to the shape of their associated decorative element. The shapes may be filled in as shown in FIG. 2, or may be outlines, curves, lines, etc. In some examples, one or more light guides (not shown) are used instead of a reflector to direct the light emitted by the light source 130 toward the collimators 205.

Returning to FIG. 1, the example decorative element 120 is formed using ink, material or structure that implements one or more optical transformations, such as de-collimating (e.g., diffusing, scattering, spreading out, etc.) the light rays 150 to, for example, provide a desired field of view. However, the decorative element 120 need not de-collimate the light rays 150. Moreover, the decorative element 120 may implement any number and/or type(s) of other optical transformations and/or effects such as, but not limited to, color filtering (e.g., changing a color), and focusing (e.g., redirecting the light up, down, right, and/or left to improve viewability). Additionally or alternatively, optical transformations may be implemented by elements embedded in a thin, flexible and sometimes transparent electronic substrate.

Terms such as, but not limited to, approximately, substantially, generally, etc. are used herein to indicate that a precise value, relationship, position, orientation, etc. is not required, need not be specified, etc. As used herein, such terms will have ready and instant meaning to one of ordinary skill in the art.

In this specification and the appended claims, the singular forms "a," "an" and "the" do not exclude the plural reference unless the context clearly dictates otherwise. Further, conjunctions such as "and," "or," and "and/or" used in this specification and the appended claims are inclusive unless the context clearly dictates otherwise. For example, "A and/or B" includes A alone, B alone, and A with B; "A or B" includes A with B; and "A and B" includes A alone, and B alone. Further still, connecting lines or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A human machine interface assembly, comprising:
   a top surface having a decorative element to be illuminated;
   an electronic substrate positioned below the top surface, the electronic substrate having a top side, a bottom side, and a plurality of parallel collimators defined therethrough;
   a reflector mounted on the bottom side of the electronic substrate;
   a light source mounted on the bottom side of the electronic substrate and oriented such that emitted light is directed by the reflector towards the plurality of parallel collimators; and
   the plurality of parallel light collimators collimating visible light emitted by the light source and directing the collimated light toward a bottom side of the decorative element.

2. A human machine interface as defined in claim 1, wherein the decorative element comprises at least one of an optical transformation material, a de-collimating material, a color filtering material and/or a focusing material.

3. A human machine interface as defined in claim 1, wherein the collimators comprise thru holes defined through the electronic substrate.

4. A human machine interface as defined in claim 3, wherein the substrate comprises a rigid printed circuit board (PCB) and the thru holes comprise holes drilled through the PCB.

5. A human machine interface as defined in claim 4, wherein interior surfaces of the thru holes are plated.

6. A human machine interface as defined in claim 4, wherein the light source is mounted on a bottom surface of the PCB.

7. A human machine interface as defined in claim 1, wherein the substrate comprises at least one of a flexible printed circuit board or an electronic film, and wherein the light source comprises a light emitting diode at least one of printed on or embedded in the substrate.

8. A human machine interface as defined in claim 1, further comprising a fascia having the decorative element defined thereon.

9. A human machine interface as defined in claim 8, wherein the decorative element is at least one of painted or deposited on the fascia.

10. A human machine interface as defined in claim 8, further comprising a decorative film defining the decorative element, the film affixed to the fascia.

11. A human machine interface as defined in claim 1, further comprising a fascia having the decorative element define therein.

12. A human machine interface as defined in claim 1, wherein the reflector comprises an ellipsoid shape.

13. A human machine interface as defined in claim 1, wherein the collimators are arranged in a shape generally corresponding to the shape of the decorative element.

14. A human machine interface as defined in claim 1, wherein the collimators are arranged in a circular or a square shaped area.

15. A human machine interface as defined in claim 1, wherein the light source comprises a phosphor-less light emitting diode (LED), and a phosphor diffusion material at least partially encompassing the LED.

16. A method of illuminating a decorative element of a human machine interface, the method comprising:
   providing an electronic substrate positioned below the decorative element, the electronic substrate having a top side, a bottom side, and a plurality of parallel collimators defined therethrough;

providing a reflector mounted on the bottom side of the electronic substrate;

providing a light source mounted on the bottom side of the electronic substrate and oriented such that emitted light is directed by the reflector towards the plurality of parallel collimators;

emitting light;

directing the light towards the plurality of parallel collimators by the reflector;

passing the light through the plurality of parallel collimators defined in the human machine interface; and directing the collimated light toward the decorative element.

17. A method as defined in claim 16, further comprising at least one of optical transforming, de-collimating, color filtering and/or a focusing the collimated light by passing the collimated light through at least one of the decorative element, an electronic film, and/or a fascia.

18. A method as defined in claim 16, wherein passing the light through the plurality of collimators comprises passing the light through a plurality of thru holes defined through the electronic substrate.

\* \* \* \* \*